United States Patent [19]
Grant et al.

[11] Patent Number: 5,295,399
[45] Date of Patent: Mar. 22, 1994

[54] FORCE MOMENT SENSOR

[75] Inventors: Andris P. Grant, Toronto; William J. Ballantyne, Aurora, both of Canada

[73] Assignee: Spar Aerospace Limited, Brampton, Canada

[21] Appl. No.: 843,176

[22] Filed: Feb. 28, 1992

[51] Int. Cl.$^5$ ............................................. G01L 1/22
[52] U.S. Cl. ..................................... 73/862.043
[58] Field of Search ............ 73/862.043, 862.042, 73/862.041

[56] References Cited
U.S. PATENT DOCUMENTS

| | | | |
|---|---|---|---|
| 4,566,338 | 1/1986 | Fleming et al. | 73/862.36 |
| 4,625,568 | 12/1986 | Hartung et al. | 73/862.55 |
| 4,657,096 | 4/1987 | Angelbeck | 177/163 |
| 4,840,073 | 6/1989 | Aoki et al. | 73/862.36 |
| 4,852,411 | 8/1989 | Beihoff | 73/862.36 |
| 4,976,160 | 12/1990 | Dobler et al. | 73/862.36 |
| 4,998,441 | 3/1991 | Stuart | 73/862.04 |
| 5,020,378 | 6/1991 | Hesthamer et al. | 73/779 |
| 5,036,713 | 8/1991 | Ikeda et al. | 73/862.36 |
| 5,053,701 | 10/1991 | Porkristl et al. | 324/207.26 |
| 5,063,788 | 11/1991 | Ch'Hayder et al. | 73/862.043 |

FOREIGN PATENT DOCUMENTS
507790 3/1976 U.S.S.R. ........................ 73/862.041

OTHER PUBLICATIONS
Fock, K. et al. Multi-Component Digital . . . Intelligent Robots. Finommech-Mikrotech. (Hungary) vol. 19, No. 10, Oct. '80, pp 289-296.

*Primary Examiner*—Jerry W. Myracle

[57] ABSTRACT

A force moment sensor for interjection in a load path comprises two rings having a common central axis joined by a resilient wall. Three or four tongue-like targets attached to one of the rings and equally spaced about the periphery of the ring project parallel to the central axis and a like number of proximity sensing assemblies attached to the other ring detect the proximity of these targets. These target-sensing assembly pairs allow sensing of forces along the central axis and torques about the two shear axes. Three or four additional tongue-like targets attached to one of the rings and equally spaced about the periphery of the ring project perpendicular to the central axis and a like number of sensing assemblies attached to the other ring detect the proximity of these targets. These target-sensing assembly pairs permit the measuring of forces along the two shear axes and torque about the central axis.

13 Claims, 4 Drawing Sheets

1

FORCE MOMENT SENSOR

BACKGROUND OF THE INVENTION

Field of the Invention

This invention relates to a force moment sensor.

Description of the Related Art

To measure forces and moments in a robot arm a force moment sensor with strain gauges typically bonded to its internal structure is inserted in the load path of the arm. A strain gauge measures the strain in the small region of the structure to which it is bonded and can typically resolve local displacements down to one microinch. Where the stiffness of the structure of the sensor is such that the loads to be measured will result in a displacement of a smaller magnitude, it is necessary to modify the structure of the sensor to concentrate the stress at the bonding site by providing a region of greater flexibility. The bonding of strain gauges is not an exact science and requires great care to ensure repeatable performance. Strain gauges have a limited range and are sensitive to overload. Temperature changes result in structural displacements in the order of microinches over the length of the strain gauge. Consequently, compensation schemes are necessary in order to separate temperature changes from displacements due to loads.

SUMMARY OF THE INVENTION

The present invention seeks to provide a force moment sensor using non-contact technology in order to overcome inherent problems of strain gauge (or other contact technology) based force moment sensors.

According to the present invention, there is provided a force moment sensor for interjection in a load path comprising the following: a rigid first reference member; a rigid second reference member spaced from said first reference member; a resilient member interconnecting said first and second reference members such that the spacing between said first and second reference members may vary with flexing of said resilient member; at least six targets, each of said at least six targets for attachment to one of said first and second reference members; for each of said at least six targets, a target proximity sensing means for attachment proximate said each target to the other of said first and second reference members so as to form a target-sensing means pairs; each said target-sensing means pair being oriented and positioned so as to provide an indication of a displacement of said first reference member with respect to said second reference member in each of the three-spatial dimensions and an indication of any pivoting of said first reference member with respect to said second reference member in each of the three-spatial dimensions.

The sensor is robust due to the measuring elements (which are the target-sensing means pairs) not experiencing mechanical loading and due to the ability to better distribute the strains in the load carrying structure of the sensor, leading to higher elastic and fatigue limits. Hysteresis is avoided since the performance of the sensor depends only on the properties of the resilient interconnecting member and not on the properties of any bond connecting the measuring elements to the supporting structure of the sensor.

BRIEF DESCRIPTION OF THE DRAWINGS

In the figures which disclose example embodiments of the invention,

FIG. 5b is a perspective view of a portion of the force moment sensor of FIG. 5a.

DESCRIPTION OF THE PREFERRED EMBODIMENTS

Figure 1:
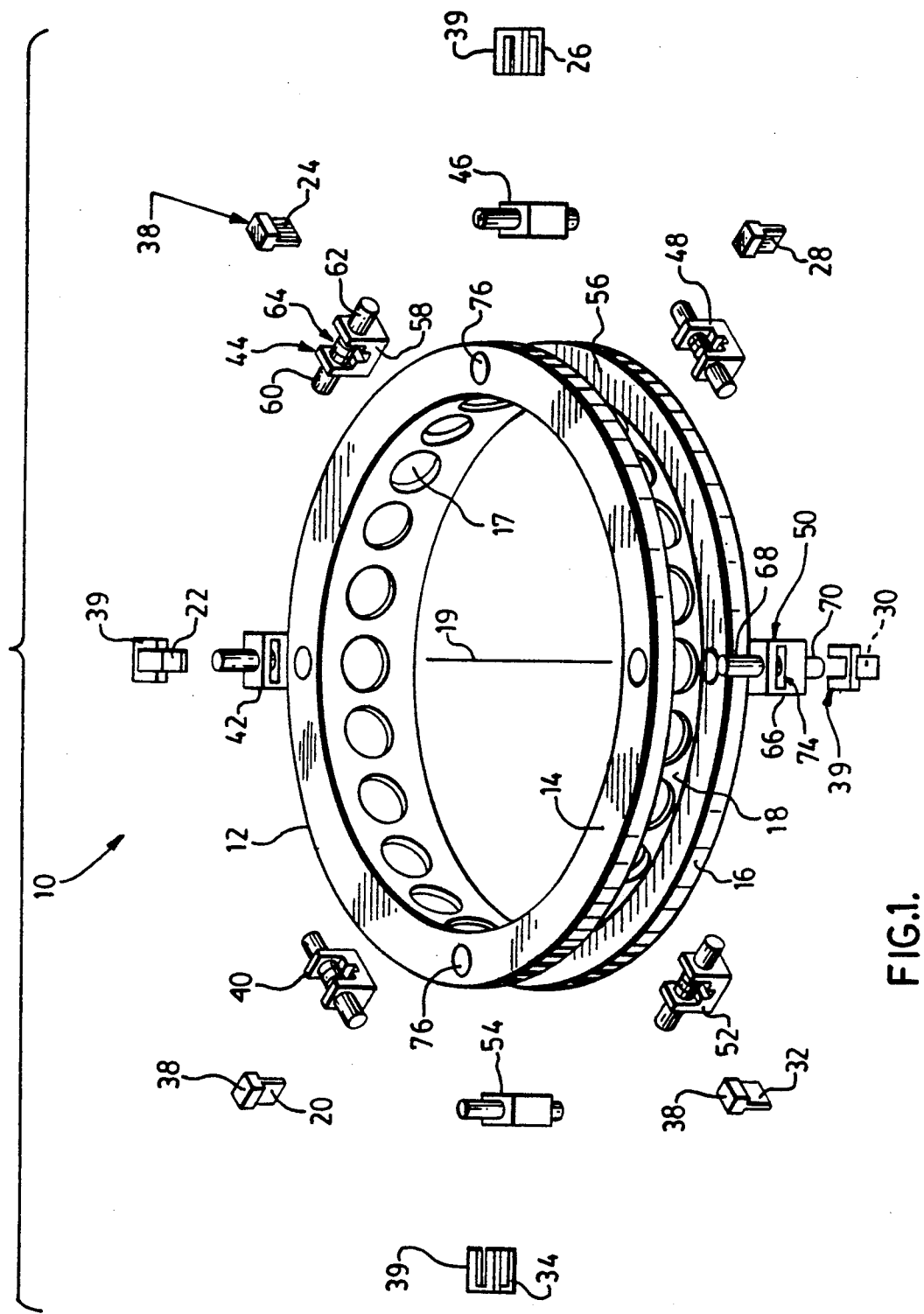
FIG. 1 is an exploded perspective view of a force moment sensor made in accordance with this invention.
Figure 2:
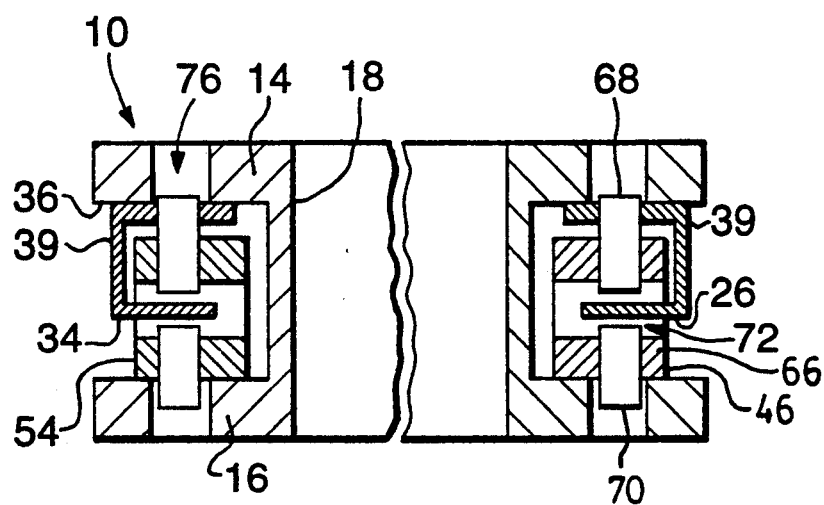
FIG. 2 is a cross-sectional view of the force moment sensor depicted in FIG. 1.

With reference to FIGS. 1 and 2, a force moment sensor 10 comprises an integral load bearing structure 12 having a rigid ring 14, a rigid ring 16 spaced from ring 14, and a resilient cylindrical wall 18 interconnecting the rigid rings. The wall is relatively thin and has a number of openings 17 therethrough which results in the wall being resilient as compared with the rings. The rings of the load bearing structure have a common central axis 19. The mounting ends 38, 39 of eight targets 20, 22, 24, 26, 28, 30, 32, and 34 are attached to the inner surface 36 of ring 14. The targets are of two types: those (20, 24, 28, 32) where the tongue-like target projects in a direction generally parallel with the central axis 19 and those (22, 26, 30, and 34) where the tongue-like target projects in a direction generally perpendicular to the central axis 19. The targets are positioned such that for each target there is a diametrically opposite target. Furthermore, targets of the same type are spaced ninety degrees apart about the circumference of the ring 14.

Eight proximity sensing assemblies 40, 42, 44, 46, 48, 50, 52, and 54 are attached to the inner surface 56 of ring 16 with each being attached proximate one of the targets so as to form a target-sensing assembly pair. The sensing assemblies are of two types. One type (40, 44, 48, 52) comprises a U-shaped frame 58 supporting two sensors 60 and 62 so as to provide a gap 64 between the sensors. Each of these sensing assemblies is positioned proximate one of targets 20, 24, 28, and 32 so that the target is positioned centrally within gap 64. The other type of sensing assembly (42, 46, 50, and 54) comprises a box-shaped frame 66 supporting two sensors 68 and 70 so as to provide a gap 72 therebetween. A slot 74 in the frame 66 exposes gap 72. Each of these sensing assemblies is positioned proximate one of targets 22, 26, 30 and 34 so that the target passes through slot 74 and is positioned centrally within gap 72. Openings 76 in rings 14 and 16 accommodate the ends of the sensors 68 and 70 of the sensing assemblies 42, 46, 50, and 54.

Figure 3:
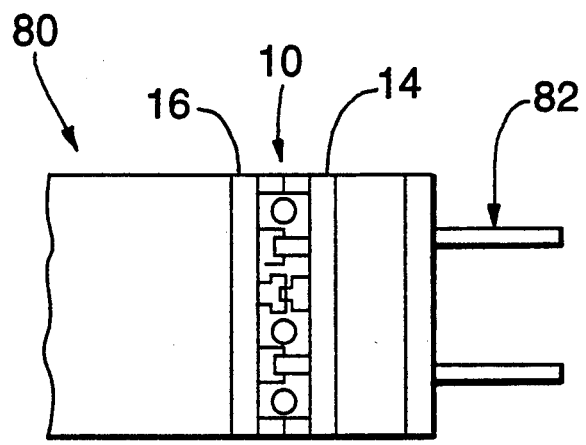
FIG. 3 is a side schematic view of a portion of a robot arm incorporating the force moment sensor of this invention.

Referring briefly to FIG. 3, force moment sensor 10 is shown interjected in the load path of a robot arm 80 having a gripper 82. Ring 14 of the force moment sensor is shown joined to the gripper side of the robot arm.

The principle of operation of the force moment sensor 10 is described first with reference to FIG. 2. If a compressive (or tensile) force is applied to the sensor 10 this deforms resilient wall 18 to displace the ring 14 incrementally toward (or away from) ring 16. Since targets 26 and 34 are attached to ring 14 whereas sensor assemblies 46 and 54 are attached to ring 16, the movement of ring 14 toward ring 16 moves the targets closer to sensors 70 of the sensor assemblies. The output of each sensor 70 is proportional to the proximity of the target 26 or 34 thereto; this permits the calibration of the output of the sensors 70 so that they indicate the magnitude of the force.

If a torque is applied to the sensor 10 which tilts ring 14 clockwise with respect to ring 16 in the plane of the cross-sectional view of FIG. 2, target 26 moves closer to sensor 70 of sensor assembly 46 while target 34 moves away from sensor 70 of sensor assembly 54. Because one sensor will provide an output indicative of a greater proximity and the other an output indicative of a lesser proximity, the clockwise torque is distinguishable from a compressive or tensile force and the sensors 70 will also provide an indication of the magnitude of this torque.

The purpose of sensors 68 of sensor assemblies 46 and 54 is to allow for common mode noise rejection, thereby improving signal quality. The differential configuration also results in temperature compensation, as follows. If the thermal coefficients of the frame 66 of sensor assemblies 46 and 54 and of the mounting end 39 of targets 26 and 34 match that of the load bearing structure 12, then any expansion or contraction of the force moment sensor 10 due to temperature change will result in the relative distances between the sensors 68, 70 and the targets remaining the same. Consequently, if the outputs of sensors 68 and 70 are combined differentially, the output signal due to temperature is cancelled.

With reference now to FIG. 1, target-sensing assembly pairs 34-54 and 26-46 provide an indication of any compressive or tensile force and of any torque about a line (measurement axis) joining target-sensing assembly pairs 22-42 and 30-50. Target-sensing assembly pairs 22-42 and 30-50 provide a redundant indication of any compressive or tensile force as well as an indication of any torque about a measurement axis joining target-sensing assembly pairs 34-54 and 26-46. Target-sensing assembly pairs 20-40 and 28-48 provide an indication of any shear force in the direction of a measurement axis joining pairs 24-44 and 32-52. Pairs 20-40 and 28-48 also provide an indication of any torque about the central axis 19. Lastly, target-sensing assembly pairs 32-52 and 24-44 provide an indication of any shear force in the direction of a measurement axis joining pairs 20-40 and 28-48 as well as a redundant indication of any torque about the central axis 19. Thus, it will be apparent that the force moment sensor 10 provides an indication of torques and forces in each of the three spatial dimensions. Therefore, with the force moment sensor installed in a robot arm as illustrated in FIG. 3, the sensor will provide an indication of the forces and moments in the arm in each of the three spatial dimensions.

The thickness of cylindrical wall 18, its height, its diameter, the number of openings 17 therein, and its shape may be varied in order to select the desired flexibility for the wall. Thus, for example, the selection of the relative stiffness in the axial torsion and radial shear directions may be manipulated by changing the diameter and height of the wall. Axial stiffness may also be reduced by bowing the wall. This permits control and balancing of the sensitivities and ranges across the measurement axes. Further, the design of the wall 18 may be accomplished independently of the design of the target-sensing assembly pairs, since the target-sensing pairs are attached to rings 14 and 16. Consequently, the integral load bearing structure 12 of the force moment sensor may be designed, manufactured, and tested as a separate unit and then later combined with standardized target sensing assemblies. As a unitary part, the sensor 10 is readily removed for repair.

Figure 4:
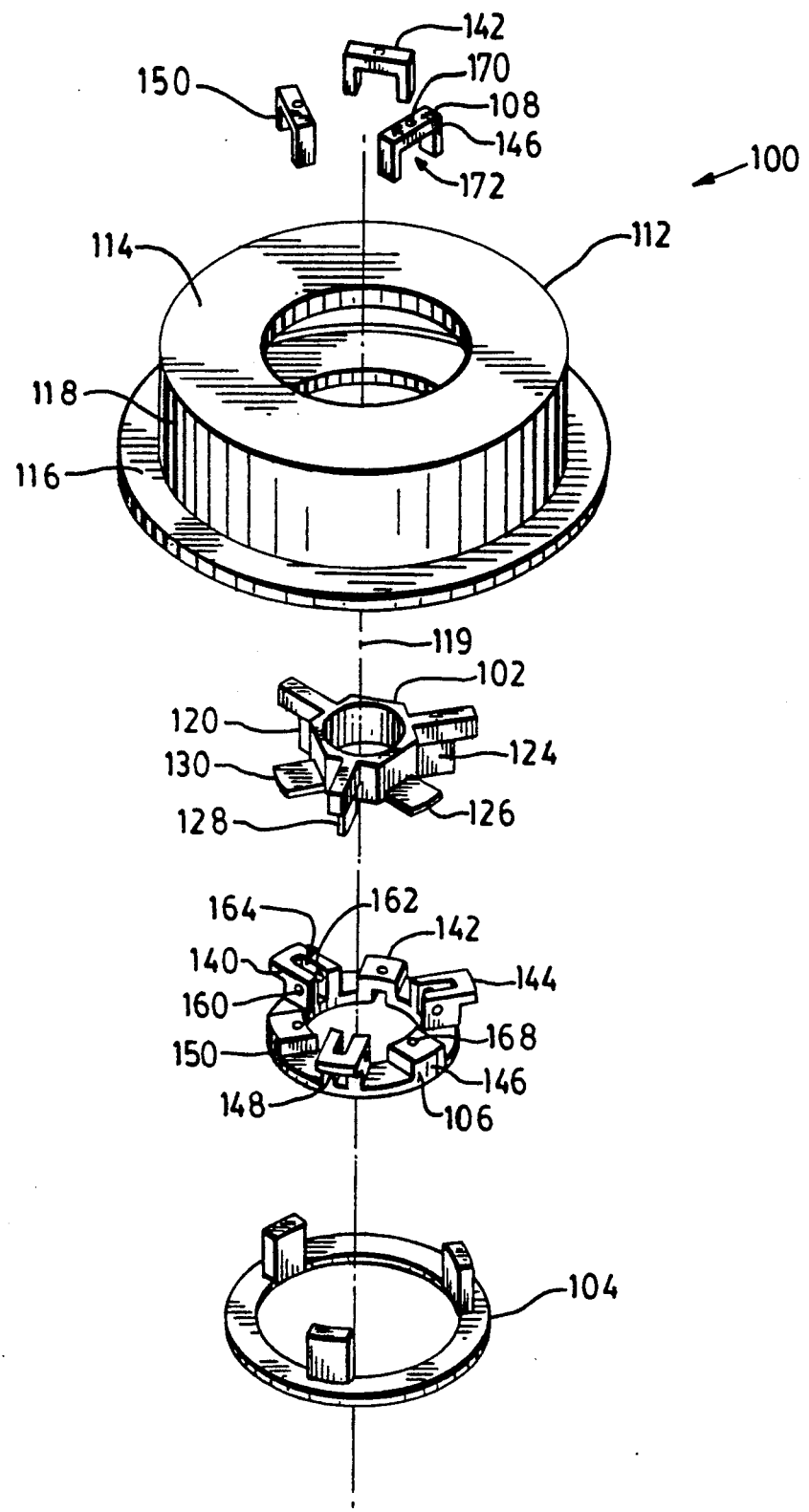
FIG. 4 is an exploded perspective view of an alternate force moment sensor made in accordance with this invention.

Turning to FIG. 4 which illustrates an alternate and preferred embodiment of the invention, a force moment sensor 100 comprises an integral load bearing structure 112 having a rigid ring 114, a rigid ring 116 and a resilient wall 118 interconnecting the rigid rings. The wall is relatively thin which results in the wall being resilient as compared with the rings. The rings of the sleeve have a common central axis 119. Six targets 120, 122 (not shown), 124, 126, 128, and 130 project from target support 102. The target support is attached to the inner surface of ring 114. The targets are of two types: those (120, 124, 128) projecting in a direction generally parallel with the central axis 119 and those (122, 126, 130) projecting in a direction generally perpendicular to the central axis 119.

Six proximity sensing assemblies 140, 142, 144, 146, 148, and 150 are supported by sensing assembly support 104. The sensing assembly support is attached to ring 116. The sensing assemblies are of two types. One type (140, 144, 148) comprising a U-shaped frame supporting two sensors 160 and 162 so as to provide a gap 164 between the sensors. Each of these sensing assemblies is positioned proximate a target 120, 124, 128 so that the target is positioned centrally within gap 164 thereby forming target-sensing assembly pairs. The other type of sensing assembly (142, 146, 150) comprises a box-shaped frame formed from base 106 and top piece 108. The base supports a sensor 168 and the top piece supports a sensor 170 so as to provide an exposed gap 172 therebetween. Each of these sensing assemblies is positioned proximate a target 122, 126, 130 so that the target is positioned centrally within gap 172 thereby forming target-sensing assembly pairs.

Target-sensing assembly pairs 120-140, 124-144, 128-148 are equally spaced sixty degrees apart around central axis 119. Similarly, target-sensing assembly pairs 122-142, 126-146, 130-150 are equally spaced sixty degrees apart around the central axis 119. With this arrangement, it will be apparent to those skilled in the art that the outputs of the sensors 160, 162, 168, and 170 may be resolved to provide indications of forces and torques in each of the three spatial dimensions.

Figure 5B:
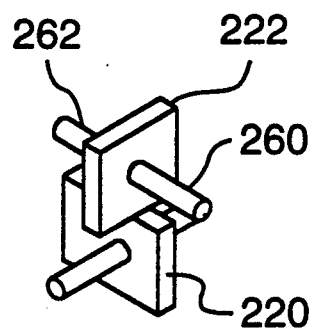
Figure 5A:
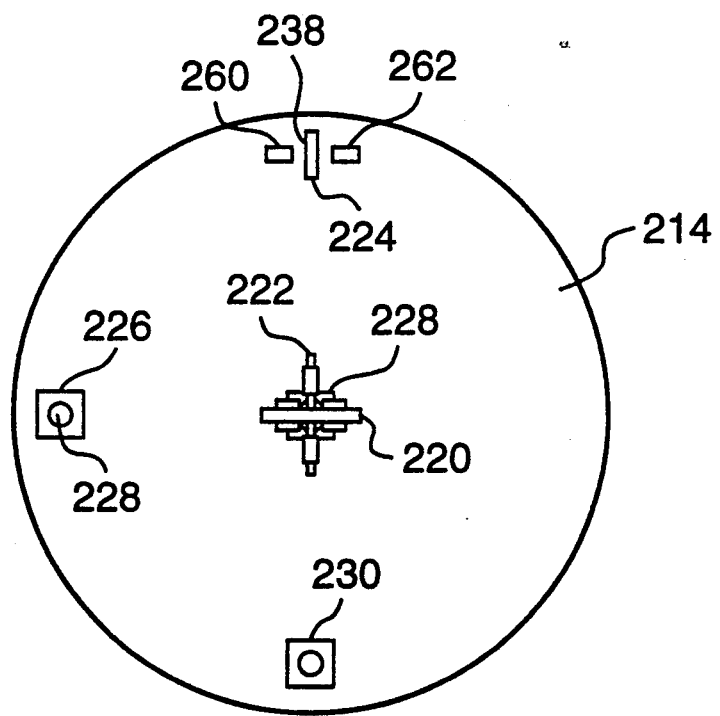
FIG. 5a is a schematic plan view of a portion of a force moment sensor made in accordance with another embodiment of this invention.

FIGS. 5a and 5b schematically illustrate another embodiment of the invention. FIG. 5a illustrates the inner surface of a plate 214 that would face a second plate and be joined thereto by a resilient member. Six targets 220, 222, 224, 226, 228, and 230 are supported by the plate 214. Targets 220, 222, 224 project parallel with the central axis of plate 214 and targets 226, 228, and 230 project perpendicular to the central axis of plate 214. Targets 220, 222, and 228 cross the central axis of the plate 214. Proximity sensors 260 and 262 are positioned on either side of targets 220, 222, 224 and proximity sensors 268, 270 (not shown) are positioned on either side of targets 226, 228, 230. The proximity sensors are part of proximity sensor assemblies attached to the second plate. Targets 220, 222 permit the sensing of forces along the two shear axes. Target 224 permits the sensing of torque about the central axis of the plate. Targets 226, 228, 230 permit the sensing of forces along the central axis and of torques about the shear axes which would tilt plate 214 toward the second plate.

As a further alternate embodiment of the invention, six target-sensing assemblies may be arranged, one each, along the six edges of a tetrahedral shape.

While the force moment sensor of the subject invention has been described in connection its use in a robot arm, it will be apparent that the sensor would also have utility when interjected in the load path of other structures. The sensor assemblies of the force moment sensor have been described as each having two sensors connected differentially to permit temperature compensation. It will, however, be apparent to those skilled in the art that each sensor assembly could have a single proximity sensor. In such case, a device (such as a thermocouple) to measure the local temperature may be used along with a look-up table to correct for temperature effects in the actual sensor output.

It will also be apparent to those skilled in the art that the number of target-sensing assemblies required depends on which forces and torques of the three spatial dimensions are of interest and may be reduced to a minimum of one target-sensing assembly to measure a force and to a minimum of two target-sensing assemblies to measure a torque.

Other modifications will be apparent to those skilled in the art and, accordingly, the invention is defined in the claims.

What is claimed is:

1. A force moment sensor for interjection in a load path comprising the following:
   a rigid first reference member;
   a rigid second reference member spaced from said first reference member;
   a resilient member interconnecting said first and second reference members such that the spacing between said first and second reference members may vary with flexing of said resilient member;
   at least six targets, each of said at least six targets for attachment to one of said first and second reference members;
   for each of said at least six targets, a target proximity sensing means for attachment proximate said each target to the other of said first and second reference members so as to form a target-sensing means pair;
   each said target-sensing means pair being oriented and positioned so as to provide an indication of a displacement of said first reference member with respect to said second reference member in each of the three-spatial dimensions and an indication of any pivoting of said first reference member with respect to said second reference member in each of the three-spatial dimensions.

2. The force moment sensor of claim 1 wherein, in each target-sensing means pair the sensing means comprises two sensors, one on either side of the target.

3. The force moment sensor of claim 2 wherein said first and second rigid members are generally cylindrical and have a common central axis.

4. The force moment sensor of claim 3 wherein at least three of said targets project from the rigid member to which they are attached in a direction generally parallel with said central axis and wherein at least three of said targets project in a direction generally perpendicular with said central axis.

5. The force moment sensor of claim 4 wherein said target-sensor pairs are located proximate the periphery of said first and second rigid members.

6. The force moment sensor of claim 1 wherein said rigid first reference member, said rigid second reference member, and said resilient interconnecting member form a unitary structure with said resilient member being constructed with desired flexure characteristics.

7. A force moment sensor for interjection in the load path of a robot arm having a gripper, comprising:
   a first rigid member for interjection in a robot arm;
   a second rigid member spaced from said first reference member for interjection in said arm on the gripper side of said first rigid member;
   a relatively resilient member joining said first and second rigid members such that the spacing between said first and second rigid members may vary with flexing of said resilient member;
   at least six targets, each for attachment to one of said first and second rigid members;
   for each of said at least six targets, a target proximity sensing means attached proximate the target to the other of said first and second rigid members so as to form a target-sensing means pair, whereby at least six target sensing means pairs are formed;
   said target-sensing means pairs being oriented and positioned so as to provide an indication of any displacement of said first rigid member with respect to said second rigid member in each of the three-spatial dimensions and an indication of any pivoting of said first rigid member with respect to said second rigid member in each of the three-spatial dimensions.

8. The force moment sensor of claim 7 wherein, in each target-sensing means pair the sensing means comprises two sensors, one on either side of the target.

9. The force and moment sensor of claim 8 wherein said first and second rigid members are generally cylindrical and have a common central axis.

10. The force and moment sensor of claim 9 wherein at least three of said targets project from the rigid member to which they are attached in a direction generally parallel with said central axis and wherein at least three of said targets project in a direction generally perpendicular with said central axis.

11. The force and moment sensor of claim 10 wherein said target-sensor pairs are located proximate the periphery of said first and second rigid members.

12. The force and moment sensor of claim 11 wherein said resilient member comprises a resilient generally cylindrical wall of selectable thickness, diameter, and length.

13. The force and moment sensor of claim 12 wherein there are eight target-sensing means pairs, positioned such that for each pair there is a diametrically opposite pair, each set of opposite pairs having targets either both generally parallel with said central axis or both generally perpendicular with said central axis.

* * * * *